W. A. GREAVES.
MACHINE TOOL.
APPLICATION FILED APR. 30, 1915.

1,194,620.

Patented Aug. 15, 1916.

WITNESSES.
Wm. A. Morris
S. H. Reck

William A. Greaves, INVENTOR.
By Robert S. Carr, Attorney.

THE NORRIS PETERS CO., PHOTO-LITHO., WASHINGTON, D. C.

UNITED STATES PATENT OFFICE.

WILLIAM A. GREAVES, OF CINCINNATI, OHIO.

MACHINE-TOOL.

1,194,620.  Specification of Letters Patent.  Patented Aug. 15, 1916.

Application filed April 30, 1915. Serial No. 24,928.

*To all whom it may concern:*

Be it known that I, WILLIAM A. GREAVES, a citizen of the United States, residing at Cincinnati, Ohio, have invented a new and useful Improvement in Machine-Tools, of which the following is a specification.

My invention relates to machine tools, and the objects of my improvements are, to provide means for maintaining a pinion in accurate engagement with a rack and prevent excessive wear on the bearings; to provide a pinion with a supplemental bearing for supporting one of its ends, and to provide simple and durable construction and assemblage of the coacting members for securing facility of operation and accuracy with efficiency of action. These objects may be attained in the following described manner, as illustrated in the accompanying drawings, in which:—

Figure 1:
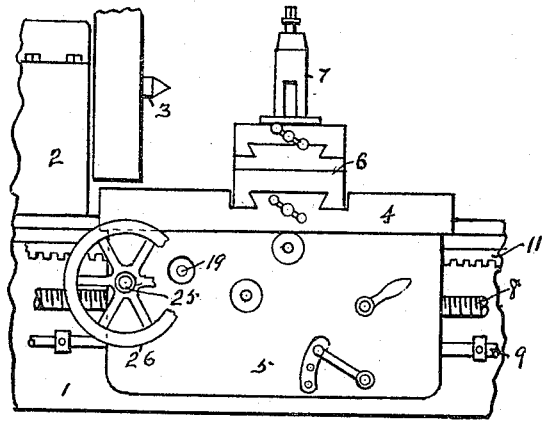
Figure 2:
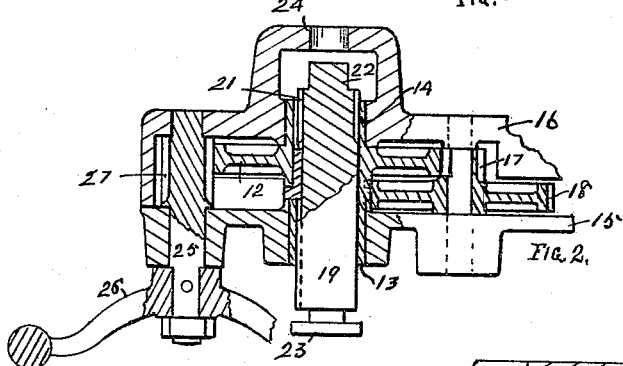
Figure 3:
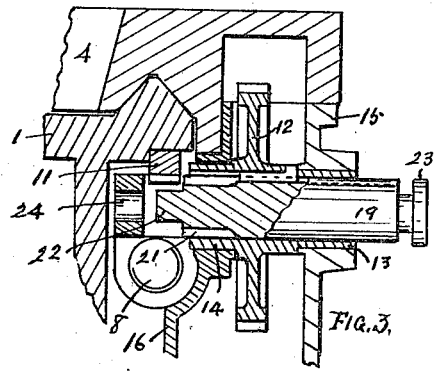

Figure 1 is a front elevation of parts of an engine lathe embodying my improvements; Figs. 2 and 3 horizontal and vertical sections respectively of portions of the carriage apron on the axial line of the rack pinion.

In the drawings, 1 represents the bed of an engine lathe, 2 the headstock, 3 the live center, 4 the carriage, 5 the apron depending by its rear wall therefrom, 6 the compound cross-slide, 7 the tool post, 8 the lead screw, 9 the feed rod and 11 the rack, all being constructed and arranged in the ordinary manner.

Gear 12 is formed with extended hubs 13 and 14 whereby it may be journaled in the front and rear walls 15 and 16 of the carriage apron and driven in the ordinary manner from the feed rod through the usual train of gears including the gears 17 and 18. The shaft 19 having formed thereon the rack pinion 21 and journal 22, is splined in gear 12 and movable longitudinally therein by means of the knob 23 secured on its outer end.

The rear wall 16 of the apron depends from the carriage adjacent to the rack 11 and is formed with the bracket bearing 24 which projects rearwardly therefrom beyond the rack for the removable engagement therewith of the journal 22. The shaft 25 journaled in the apron is provided with the usual hand wheel 26 and also with the pinion 27 in engagement with the gear 12 for moving the carriage along the shears during the disengagement of the feed rod and the engagement of the rack pinion with the rack.

In operation, when the shaft 19 is moved in a rearward direction with the pinion 21 into engagement with the rack, the journal 22 is simultaneously engaged within the bracket bearing. This supplemental bearing for the rear end of the pinion serves to maintain it in more accurate and unyielding relation to the rack. Any wear on the journals or bearings of the gear 12, or looseness of the shaft 19 splined therein may be compensated for by the engagement of the journal 22 in the supplemental bearing, as a pinion may be more accurately maintained in position with bearings on both, instead of only one end.

To provide and maintain accuracy in the operation of machine tools is so desirable that in their construction even small steps in advance of the state of the art receive due consideration and are considered to be of much value.

Having fully described my improvements, what I claim as my invention and desire to secure by Letters Patent of the United States is:—

An engine lathe comprising a bed provided with a rack, a carriage movable on the bed, an apron the rear wall thereof depending from the carriage and, adjacent to the rack, said rear wall being formed with a bearing projecting rearwardly therefrom beyond the plane of the rack, a driven gear journaled in the walls of the apron, a shaft splined therein and formed with a pinion and with a rearwardly projecting journal, and a pull knob on the front end of the shaft for moving it longitudinally to simultaneously engage or disengage the pinion and journal with the respective rack and bearing.

WM. A. GREAVES.

Witnesses:
R. S. CARR,
S. H. RECK.

Copies of this patent may be obtained for five cents each, by addressing the "Commissioner of Patents, Washington, D. C."